United States Patent

[11] 3,573,423

[72] Inventor Donald J. Medlin
Berea, Ohio
[21] Appl. No. 857,971
[22] Filed Sept. 15, 1969
[45] Patented Apr. 6, 1971
[73] Assignee Fastener Industries, Inc.
Cleveland, Ohio

[54] VACUUM ELECTRODE FOR WELD NUTS
15 Claims, 5 Drawing Figs.
[52] U.S. Cl.................................................. 219/119,
219/138
[51] Int. Cl..................................................... B23k 9/24,
B23k 9/28
[50] Field of Search........................................... 219/119,
138; 294/64; 269/21; 279/3

[56] References Cited
UNITED STATES PATENTS
2,701,723  2/1955  Ekberg.......................... 279/3
3,318,468  5/1967  Olson............................ 294/64
3,388,234  6/1968  Gentle, Jr..................... 219/119

Primary Examiner—J. V. Truhe
Assistant Examiner—Lawrence A. Rouse
Attorney—Bosworth Sessions, Herrstron & Cain ABSTRACT: An electrode for attaching weld nuts and the like to a workpiece, such as a steel sheet, in which an electrode body has a bore extending inwardly from an end face and pilot-positioning means is adjustably mounted in the bore to adapt the electrode for weld nuts of varying sizes. The electrode bore can be evacuated so that, in combination with the pilot-positioning means, a weld nut is retained by the vacuum against the end face of the electrode in suitable welding position.

PATENTED APR 6 1971
3,573,423
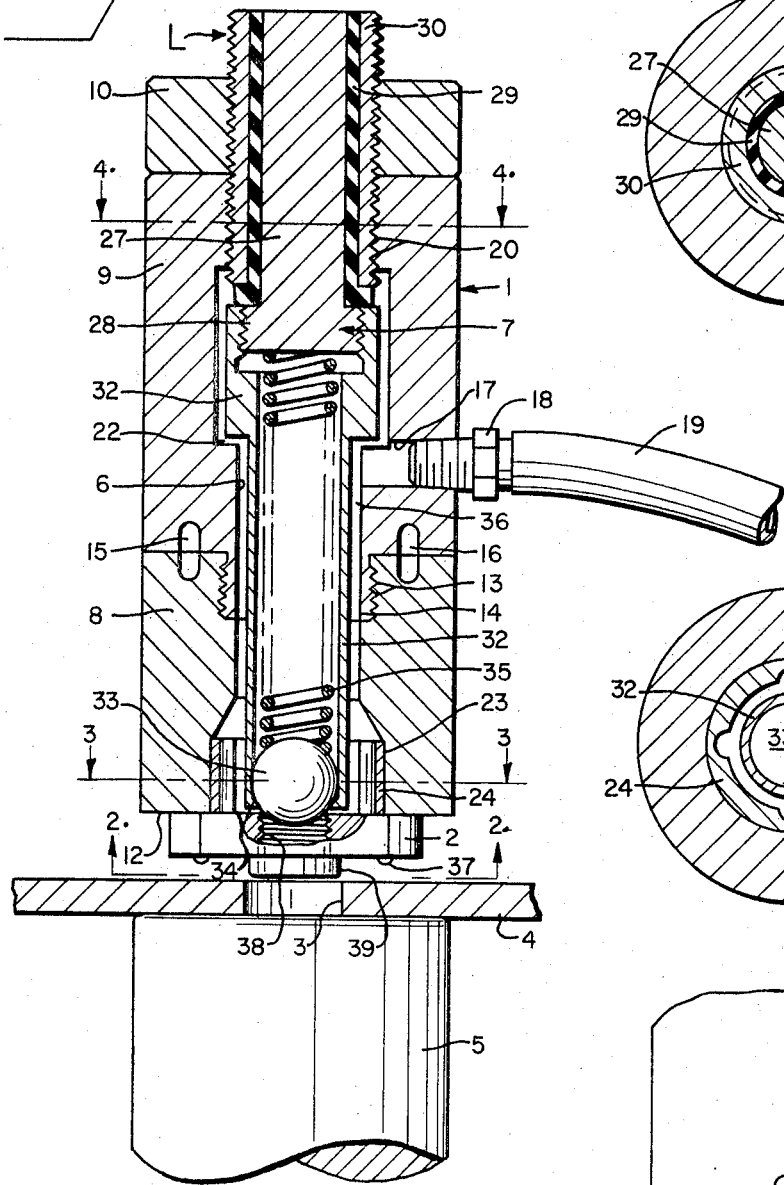
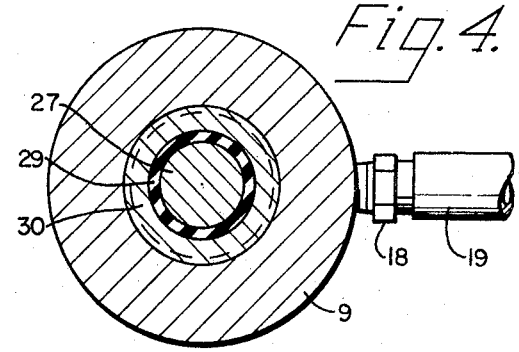
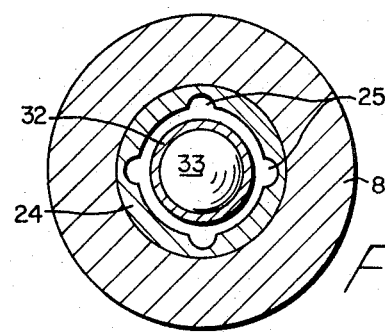
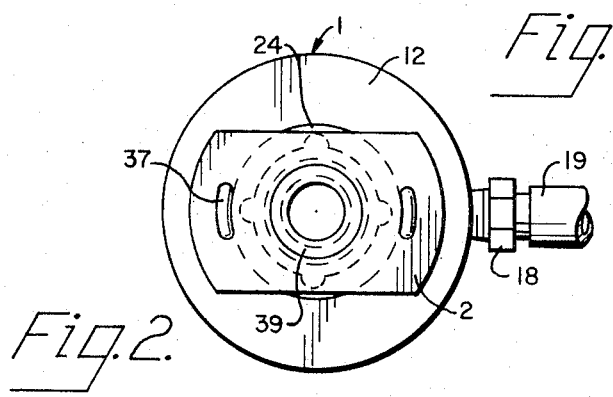
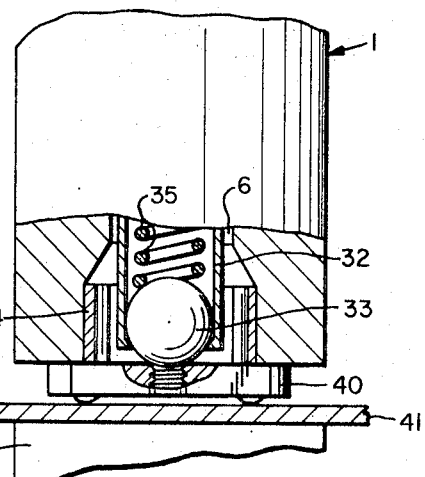
INVENTOR
DONALD J. MEDLIN
BY Bosworth, Sessions
Herrstrom & Cain
ATTORNEYS.

VACUUM ELECTRODE FOR WELD NUTS

BACKGROUND OF THE INVENTION

This invention relates to a vacuum electrode for welding nuts and the like to a metallic workpiece in which, prior to welding, the nuts are held by vacuum against an end of the electrode. More particularly, the present invention relates to such an electrode for use with weld nuts of varying sizes and for centering them from above the workpiece of which they are to be welded.

It is common practice to attach weld nuts to a sheet metal or other metallic support by providing the weld nuts with small projections or nipples. The projections of the nut rest upon one side of the sheet. An electrode engages a side of the nut that is opposite from the projections, while another electrode engages the opposite side of the sheet metal so that, when pressure and current are applied, the projections are heated as a result of their electrical resistance and become welded to the sheet. When the sheet metal or other metal support has an opening at which it is desired to weld a nut, the latter may also have a pilot portion formed on the same side as the welding projections, the pilot portion fitting into the opening in the sheet metal and serving properly to locate the nut.

Previously, the weld nut was first suitably located on the sheet metal part by hand. A solid upper welding electrode was then brought down upon the upper face of the nut while a solid lower electrode was held in place below the sheet. Current was then applied to complete the weld.

Another technique of attaching weld nuts of the type described is disclosed and claimed in U.S. Pat. No. 2,731,535 to Grey. In this technique, a weld nut is located at an opening in a sheet from below the sheet. A centering element, forming part of the lower electrode, has a pilot which extends vertically upwardly through the opening in the sheet to enter the hole in the nut and thereby position it as desired at the opening. While this practice has been highly successful, it is inherently restricted to welding a nut at such an opening.

SUMMARY OF THE INVENTION

It is an object of the present invention to provide an electrode for attaching weld nuts or the like to sheet metal or other metallic supports in which an electrode physically stationed above the sheet metal holds the nut by vacuum and governs its positioning on the sheet. Accordingly, the present electrode can be used to attach a weld nut either to a solid metal sheet, since the nut is applied from above the sheet, or to metal sheet having an opening at which the nut is to be welded. Another object is to provide such an electrode that has adjustable pilot-centering means whereby the electrode can be adapted for use with weld nuts of varying sizes. Other objects and advantages will be apparent from the following description.

Generally speaking, the present vacuum electrode includes an electrode body having a bore and pilot-positioning means adjustably mounted within the bore. In one form, the pilot-positioning means includes a sleeve member containing at an open end a resiliently mounted ball effective to make engagement with the opening in a weld nut. The bore is capable of being evacuated so that atmospheric pressure acting on the weld nut will hold it against the end face of the electrode. The sleeve member can be adjustably positioned within the bore so as to expose varying amounts of the ball and thereby achieve proper indexing engagement with weld nuts having openings of varying sizes.

BRIEF DESCRIPTION OF THE DRAWINGS

FIG. 1 is a central, longitudinal section of an electrode of the present invention with a weld nut held by vacuum against the end of the electrode, a sheet metal workpiece having an opening positioned to receive the weld nut pilot, and the other electrode also being shown;

FIGS. 2, 3, and 4 are sections of FIG. 1 on the lines 2-2, 3-3, and 4-4, respectively; and FIG. 5 is a fragmentary, central, longitudinal section of an electrode, similar to that of FIG. 1, in which the pilot-positioning means has been adjusted to locate a weld nut having a smaller threaded hole, the electrode shaving been brought together until the welding projections on the nut have just engaged the surface of the sheet metal workpiece.

DESCRIPTION OF THE ILLUSTRATED EMBODIMENT

Referring to the drawings, an electrode of the present invention generally indicated at 1 is illustrated in the process of positioning a weld nut 2 at an opening 3 in the sheet metal workpiece 4 for subsequent welding by conventional cooperation with the second lower electrode 5. The electrode 1 has a central bore 6 in which nut-positioning means, generally indicated at 7, is adjustably carried.

The body of electrode 1 may be described as comprising three superposed, tubular sections 8, 9, and 10 having substantially the same outside diameter. Section 8 has an end face 12 and is internally threaded at 13 at its upper end (as viewed in FIG. 1). Section 9 has a threaded projection 14 which mates with threads 13. If desired, sections 8 and 9 may have aligned recesses 15 and 16, respectively, for the circulation of a coolant therethrough in a conventional manner. Section 9 has a connecting port 17 to receive a nipple 18 attached to a hose 19. The hose is connected to suitable evacuating means (not shown) such as a standard vacuum pump. Tubular section 9 is also internally threaded at its upper end as at 20. Section 10 is an internally threaded lock nut which cooperates with the threads 20 of section 9 to adjustably secure the nut-positioning means, hereinafter described, to the electrode section 9.

Tubular sections 8 and 9 in particular define the bore 6 of the electrode. As shown by FIG. 1, the bore 6 has a radially enlarged portion 22 within section 9, and at its lower portion flares outwardly to form a widened axial section 23 adjacent the end face 12. An annular insert 24 (FIG. 3) has a press fit in axial section 23 and preferably consists of a metal harder than the metal of the electrode body 1. For example, insert 24 may be fabricated from hard brass, while the sections 8, 9, and 10 of the electrode body are made from copper. Use of a relatively hard insert prevents the softer copper of section 8 from necking-in as a result of repeated use of the electrode and thereby maintains a proper opening in bore 6. The insert 24 may also have substantially axially directed grooves 25 to ensure adequate suction on the weld nuts to ensure proper holding thereof.

Referring next to the nut-positioning means mounted with bore 6, such means includes, in the embodiment illustrated, a locating member L in the form of a solid, cylindrical plug 27 having an externally threaded bottom flange 28. A sleeve 29, which may be of any electrically insulating material such as rubber, fiber or the like, surrounds the plug 27, and an externally threaded nipple 30 is press fitted on the sleeve 29. The nipple 30 engages the threads 20 of section 9 as well as those of the nut 10 which locks the cylindrical plug 27 in the desired position relative to section 9.

A tubular sleeve 32 below the cylindrical plug 27 has an enlarged, internally threaded upper end which engages the threads of flange 28. The inner diameter of the sleeve 32 freely fits a nut-locator ball 33, while the lower end of the sleeve is upset or inwardly flared to define retainer flange means 34 adapted to hold the ball within the sleeve and to limit the amount of the ball that may project outwardly beyond the flange 34. The sleeve 32 also contains a coil spring 35 which bears at one end against the bottom of cylindrical plug 27 and at the other against ball 33. The spring is under compression so as to urge the ball toward the open end of sleeve 32 and toward end face 12 of the electrode, thereby resiliently holding the ball against flange 34 in the position shown in FIG. 1.

It will be noted that in addition to insulating sleeve 29, an air gap 36 separates the nut-positioning means (principally the sleeve 32 and its attendant parts) from physical contact with electrode body 1. Accordingly, when electric current is applied between electrodes 1 and 5, it is insulated from the nut-positioning means and travels only through electrode 1, weld nut 2, steel sheet 4, and electrode 5. Because the ball 33 is insulated from the electrode body it may be made of metal. However, it is preferably made of electrically insulating material such as a hard ceramic composition.

The weld nut 2 forms no part of the present invention and may be of conventional design. For example, the nut has projections 37 and a threaded opening 38 in alignment with a hollow pilot portion 39 of a size to fit within the opening 3 of the steel sheet and thereby aid in locating the nut 2.

In practice, the present electrode is used to locate and hold a weld nut on a specific centerline for placement and welding to a metallic workpiece. With the lock nut 10 backed off, turning nipple 30 moves the entire nut-positioning means 7 axially of bore 6 to the desired location of the ball 33 relative to the end face 12 of the electrode. Such means is then locked in place by tightening nut 10. The distance that ball 33 protrudes beyond end face 12 depends on the diameter of the threaded hole in the nut being located. If the ball protrudes too far from end face 12 it will hold the nut 2 away from the electrode with a resultant loss of vacuum "pull" which may prevent retention of the nut. On the other hand, if ball 33 does not protrude sufficiently for the nut being used, there is a loss of locating ability, that is, there is too much "play" between ball 33 and nut 2 permitting relative movement in a lateral direction parallel to the end face 12. This results in inaccurate positioning of the weld nut on the steel sheet.

When the proper setting of ball 33 is achieved for a given weld nut, the vacuum in bore 6 will hold weld nut 2 in position against end face 12, as shown in FIG. 1, and will prevent the nut from dropping off before the welding operation. In operation the steel sheet 4 may be moved into position below electrode 1 while a weld nut is held in position thereon, or the electrode can be first positioned over the sheet without the nut which is then placed on the electrode either manually or by automatic feeding means. The spring backing 35 of ball 33 permits weld nuts to be fed laterally across the end 12 of the electrode since the ball may lift during the lateral advance of the nut and then spring back into the threaded hole of the nut to locate it accurately. When the nut has been welded to the underlying steel sheet, the upper electrode is lifted, breaking its vacuum hold on the nut.

The vertical adjustment of ball 33 permits the electrode to be used with nuts having different sized threaded openings. To vary the effective nut-engaging diameter of the ball without adversely affecting the vacuum pull, nipple 30 is turned in the electrode body 1, with nut 10 backed away, until sleeve 32 and ball 33 are placed in a position to project the desired distance below end face 12 of the electrode, after which nut 10 is again tightened.

FIG. 5 illustrates the electrode of FIG. 1 adjusted for use with a weld nut 40 of smaller opening. It will be noted that sleeve 32 and ball 33 are retracted within bore 6 as compared to their corresponding positions in FIG. 1. FIG. 5 also illustrates the use of the present electrode to weld a nut to solid steel sheet 41, that is, one without an opening. In this case the nut 40 does not have a pilot portion as shown for the corresponding weld nut in FIG. 1.

The compression of spring 35 may be adjusted by turning the sleeve 32 on the plug 27 to give the desired resistance to movement of ball 33 up into sleeve 32. Also, if the end 12 of electrode 1 is refaced after wear or damage in use, the threaded engagement of nut-positioning means 7 in the portion 9 of electrode body permits the ball 33 to be properly located relative to the so refaced end of the electrode.

Although the illustrated embodiment of the invention has been described in considerable detail, it will be understood that variations and modifications in the specific form and arrangement of the parts may be made without departing from the spirit of this invention.

I claim:

1. A vacuum electrode for attaching weld nuts having apertures therein and the like to a workpiece comprising a body portion having an end face and a bore extending thereinto from said end face, said bore in its operative position communicating with said aperture, said body portion having conduit means communicating with said bore effective to permit evacuation thereof, nut-positioning means carried within said bore and adapted to sealingly engage the aperture in a weld nut or the like and, in cooperation with said evacuation of said bore, retain a nut against said end face, and means to adjust the axial position of said nut-positioning means whereby the electrode can be adapted for use with weld nuts of varying sizes.

2. A vacuum electrode as described in claim 1 in which said nut-positioning means has a spherical portion adapted to make said engagement with a weld nut.

3. A vacuum electrode as described in claim 2 in which said nut-positioning means has a resiliently mounted ball adapted to make said engagement.

4. A vacuum electrode as described in claim 3 in which said ball is metallic.

5. A vacuum electrode as described in claim 3 in which said ball comprises an electrically insulating material.

6. A vacuum electrode as described in claim 1 in which said nut-positioning means includes a sleeve member adapted to contain a ball disposed to make positioning engagement with a weld nut and having means adjacent the end of the sleeve to retain the ball therein.

7. A vacuum electrode as described in claim 1 in which said nut-positioning means includes a locating member secured within said bore in the electrode body and a sleeve with an open end directed toward said end face, a ball within the sleeve effective to make said engagement with a weld nut, retainer means on the sleeve to hold the ball in the sleeve, and resilient means in the sleeve normally urging the ball toward said retainer means.

8. A vacuum electrode as described in claim 7 in which said locating member is adjustably supported with respect to said bore to provide said axial adjustment of said nut-positioning means.

9. A vacuum electrode as described in claim 8 including lock means to fix the adjustable position of the locating member with respect to the electrode body.

10. A vacuum electrode as described in claim 7 in which said locating member and sleeve can be axially adjusted with respect to each other.

11. A vacuum electrode as described in claim 7 in which said locating member and sleeve are electrically insulated from said electrode body.

12. A vacuum electrode as described in claim 7 in which said resilient means is a coil spring bearing at opposite ends against said locating member and ball.

13. A vacuum electrode as described in claim 7 in which said sleeve has an air gap between it and the bore of said electrode body which extends substantially throughout the length of the sleeve.

14. A vacuum electrode as described in claim 1 in combination with a cooperating second electrode adapted at least partially to support said workpiece.

15. A vacuum electrode as described in claim 1 in combination with vacuum means to evacuate said bore of the electrode body.